United States Patent [19]

Wunderly

[11] Patent Number: 4,867,905
[45] Date of Patent: Sep. 19, 1989

[54] COMPOSITION FOR LIQUID SCINTILLATION COUNTING

[75] Inventor: Stephen W. Wunderly, Irvine, Calif.

[73] Assignee: Beckman Instruments, Inc., Fullerton, Calif.

[21] Appl. No.: 160,724

[22] Filed: Feb. 26, 1988

[51] Int. Cl.$^4$ ............................................. C09K 11/06
[52] U.S. Cl. .......................... 252/301.17; 252/301.16
[58] Field of Search ...................... 252/301.17, 301.18, 252/301.16

[56] References Cited

U.S. PATENT DOCUMENTS

| | | | |
|---|---|---|---|
| 2,824,841 | 2/1958 | Buck et al. | 252/301.2 |
| 2,985,593 | 5/1961 | Broderick et al. | 252/301.17 |
| 3,372,127 | 3/1968 | Thomas, Jr. et al. | 252/301.2 |
| 3,444,094 | 5/1969 | Krasovitsky et al, | 252/301.17 |
| 3,506,828 | 4/1970 | Hansen et al. | 250/71.5 |
| 3,711,421 | 1/1973 | Krumbiegel et al. | 252/301.17 |
| 3,928,227 | 12/1975 | Sena et al. | 252/301.2 |
| 3,939,094 | 2/1976 | Kauffman | 252/301.2 |
| 4,001,139 | 1/1977 | Long | 252/301.17 |
| 4,127,499 | 11/1978 | Chen et al. | 252/301.17 |
| 4,217,239 | 8/1980 | Kelemen et al. | 252/301.17 |
| 4,271,035 | 6/1981 | Saito et al. | 252/301.17 |

OTHER PUBLICATIONS

H. Kallman and M. Furst, NUCLEONICS, vol. 8, No. 3, Mar. 1951, pp. 32-39, "Fluorescent Liquids for Scintillation Counters".

D. A. Kalbhen and V. J. Tarkkanen, "Review of the Evolution of Safety, Ecological and Economical Aspects of Liquid Scintillation Counting Materials and Techniques", ADVANCES IN SCINTILLATION COUNTING, 1983, pp. 66-70.

*Primary Examiner*—John F. Niebling
*Assistant Examiner*—Steven P. Marquis
*Attorney, Agent, or Firm*—William H. May; Paul R. Harder

[57] ABSTRACT

A liquid scintillation solution consisting of a fluor and a select solvent is presented, said solvent having the generic formula

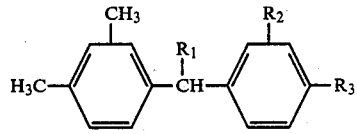

where $R_1$, $R_2$, and $R_3$ are either a methyl group or a hydrogen atom.

23 Claims, No Drawings

COMPOSITION FOR LIQUID SCINTILLATION COUNTING

FIELD OF THE INVENTION

The present invention relates to the art of liquid scintillation counting and scientific instruments used therefore, and specifically to compositions known as liquid scintillation solutions or liquid scintillation cocktails in which a radioactively labeled sample is mixed for analysis by scintillation phenomenon.

BACKGROUND OF THE INVENTION

Liquid scintillation counting is an analytical technique by which the energy of radioactive emissions from an isotope labeling a select material in a sample, is converted into light so that it can be detected and measured. By detecting and measuring light caused by the radioactive emissions, the emissions can be analyzed to determine quantitative information about the select radioactively labeled material in the sample.

The process of liquid scintillation normally takes place in a scintillation medium which is like a liquid solution. Interaction between radioactive emissions of the isotope labeling the sample and constituents of the scintillation medium result in energy transfer from the emission, which is generally a beta particle, to molecules of constituents in the medium. Some of the molecules comprising the scintillation medium can fluoresce by release of the energy which they receive, thus producing light scintillations. A liquid scintillation instrument is used to detect, measure and count these light scintillations. The intensity and number of light scintillations produced within a finite time period indicate the amount of radioactivity in the sample and thus the amount of sample material labeled with the radioactive isotope. The labeled material in the sample can thus be analyzed by the liquid scintillation system.

Tritium and carbon-14 are radioactive isotopes of hydrogen and carbon, respectively, that decay with the emission of beta radiation, i.e. beta particles. Substitution of these radioactive isotopes for stable hydrogen or carbon nuclei does not change the chemical or biological properties of the substituted organic compound. Since hydrogen and carbon are the elements which form the basis of all organic compounds, isotopes of these elements provide ideal labels for tracing studies with a liquid scintillation system.

The primary detector of radioactive emissions in a liquid scintillation system is the scintillation solution into which the sample having a radioative label such as tritium and carbon-14 is mixed. The liquid scintillation process by which the radioactive emissions of the labeling isotope are investigated, is essentially an energy transfer process in which two organic compounds in a scintillation solution participate. It is the function of this scintillation solution to convert the energy of the emitted radioactive particles into light which can be detected and measured.

The chemical nature of the liquid scintillation solution permits energy transfer from the radioactive emissions to constituents of the liquid scintillation solution causing scintillation. The liquid scintillation solution comprises a chemical known as a fluor, and also sometimes described as a primary scintillator, which is dissolved in another organic chemical known as a solvent. A fluor is the chemical constituent of the liquid scintillation solution which emits light by fluorescence when sufficient energy is received from a beta particle emitted by the labeling isotope. The solvent (alone) does not scintillate. It acts as a link in the energy transfer chain passing on its acquired energy to the fluor permitting fluorescence, i.e. light scintillation, to occur.

A beta particle traveling through the liquid scintillation solution following emission from the labeling isotope causes excitation of the solvent molecules surrounding the labeled sample molecule in the scintillation medium. As an emitted beta particle travels through the scintillation medium, molecules of the solvent come in contact with the particle. Some of these solvent molecules become converted to excited molecules as the radioactive particle loses its energy to them. In a general sense the solvent molecules receive the energy of the emitted radioactive beta particle as they become excited. The amount of energy which the emitted beta particle posseses determines how far the particle will travel before it comes to rest, since the distance the particle can travel is proportional to the amount of energy it possesses (given that its mass is constant). Because the beta particle loses energy by interaction or contact with the solvent molecules in its path (when the solvent molecules become excited to higher energy states), the number of solvent molecules that the emitted beta particle will excite is directly proportional to the distance the particle travels through the liquid scintillation solution. This in turn is proportional to the energy the particle possesses.

A typical molecule of a solvent which can be excited by coming in contact with a radioactive particle is aromatic in chemical character. The aromatic character of the molecule permits electrons comprising the double bonds between adjacent carbon atoms to become excited to a higher energy state so that the solvent molecule can retain the excitation energy for a period of time.

Once the solvent molecule is excited by absorbing energy from the emitted radioactive particle, it naturally wants to lose this energy. This is possible in one of two modes, by emission of heat or light. Before the solvent molecule can decay relieving its absorbed energy by heat, it is desired that a fluor molecule in the scintillation solution interact with the solvent molecule. This transfers the excitation energy of the solvent molecule to the fluor molecule. The fluor molecule then releases its excitation energy as light. Detection and measurement of energy received by the fluor is accomplished by simply detecting and measuring the light generated.

One of the most widely known fluors utilized in a liquid scintillation system is 2,5-diphenyloxazole (PPO) having the formula:

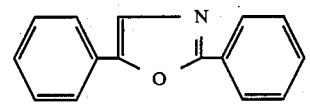

PPO exhibits a fluorescence peak at the 365 nm light wavelength.

Other fluors include 2-phenyl-5-(4'-biphenyl)-1,3,4 oxadiazole PDB wit the formula:

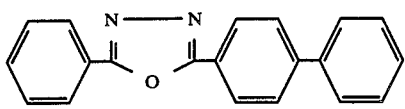

and 2-(4'-tert-butylphenyl)-5-(4'-biphenyl)-1,3,4 oxadiazole (butyl-PBD) with the formula:

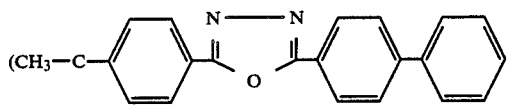

Butyl PBD is a highly efficient fluor and exhibits a fluoroscence peak at the 366 nm light wavelength.

A fluor is generally present in the liquid scintillation solution in very low concentrations, on the order of five to 10 grams per liter. Thus solvent molecules which have been exited by absorption of energy from a beta particle often transfer their energy to another solvent molecule which in turn becomes excited as the transferring solvent molecule is de-energized. This energy transfer chain can continue until an excited solvent molecule transfers this energy to a fluor molecule, which then will decay by scintillating.

Light released by a fluor is generally of a single frequency or wavelength. The quantity of light released by the fluor, however, (i.e. the number of photons of light energy released), is directly proportional to the number of solvent molecules from which the fluor receives energy over a certain period of time, or in other words the number of solvent molecules excited by the decay of the emitted beta particle. The energy transferred to an excited solvent molecule ultimately energizes a fluor molecule which then releases light by scintillation. This permits the energy of the decay of the radioactive particle to be measured by measuring intensity of light since high energy particles will have long path lengths and excite many solvent molecules, which then excite fluor molecules. Since the scintillation process takes place in a matter of nanoseconds, the number of fluor molecules fluorescing within such a small segment of time will be detected as a greater or lesser intensity of light due to the reaction time of a light detector in a liquid scintillation instrument. Thus, high energy radioactive particles emitted from the isotope will have long pathlengths and excite many solvent molecules which in turn cause fluor molecules to fluoresce many times releasing bright light. Low energy particles will have shorter pathlengths and excite fewer solvent molecules which in turn cause fewer fluor molecules to fluoresce and release dimmer light.

In some instances a secondary fluor, also referred to as a secondary scintillator, will be used to shift the wavelength region of light scintillation caused in the liquid scintillation solution to one which is more desirable. Secondary fluors are also organic compounds which are added to the liquid scintillation solution in small quantities relative to the quantity of the primary fluor. The light scintillation of a secondary fluor is caused by energy received from the primary fluor which of course is in the form of light energy. The result of having a secondary light scintillation is generally a broadening of the long light wavelength region of the primary fluor's fluorescence maximum. A secondary fluor may also be used to improve acid and base stability and enhance quench resistance of the liquid scintillation solution. A common example of a secondary scinitillator is 1,4-di-(2-methylstyryl)-benzene (Bis-MSB) which has the chemical formula

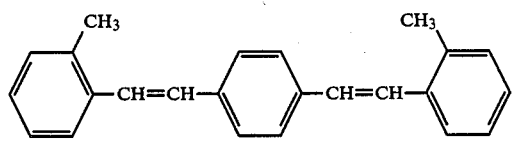

It can be seen by the above description that the solvent composition utilized in a scintillation cocktail is an important link in the chain of energy transfer. Thus, much effort has been exerted over the years to develop and improve solvent compounds. It is important that the solvent be compatible with all materials in the scintillation cocktail, particularly with the sample material to be mixed therewith. The solvent should have the capability of becoming easily excited by an emitted beta particle and the capability of retaining an excitation state for sufficient length of time that it passes energy either to another solvent molecule or a fluor molecule. In other words, the solvent should not release energy as heat to re-enter a nonexcited state before passing its energy to another molecule.

There are several special chemical characteristics that limit a choice of the solvent. First, there must be sufficient pi electrons about the solvent molecule in order for the solvent to be excited by the emitted radiation of the isotope. Secondly, the life time of the excited state should be long relative to any migration time of the solvent molecule with other solvent or fluor molecules in the scintillation solution. Thirdly, the solvent should be chemically compatible with the fluor in terms of soluability and stability. Fourthly, cost must also be considered since many solvents are very expensive compared to others, and once a liquid scintillation solution is utilized it is disposed of.

Solvents commonly used in liquid scintillation systems are aromatic compounds, e.g. derivatives of benzene, since they are efficient in transferring energy as discussed above. The more commonly used scintillation solvents and some of their characteristics are described in the fllowing chart:

| SOLVENT | STRUCTURE | Vapor* Pressure | Boiling** Point | Flash** Point | Scintilla-*** tion Yield |
|---|---|---|---|---|---|
| 1,2,4-Trimethyl Benzene (Pseudocumene) | | 2.1 | 169 | 47 | 112 |

| SOLVENT | STRUCTURE | Vapor* Pressure | Boiling** Point | Flash** Point | Scintilla-*** tion Yield |
|---|---|---|---|---|---|
| p-Xylene | H₃C—⌬—CH₃ | 9 | 138 | 25 | 110 |
| Toluene | ⌬—CH₃ | 27.5 | 111 | 4 | 100 |
| Benzene | ⌬ | | | | 85 |
| Dioxane | CH₂—CH₂ O       O CH₂—CH₂ | ~40 | ~101 | ~11 | 65 |
| Cyclohexane | ⬡ | | | | 20 |

*at 25° C. mm Hg
**°C.
***relative pulse height of the Compton Edge of the 662 keV gamma of 137C$_s$.

These solvents are listed in decreasing order of efficiency thus, the first solvent is the most efficient and effective with the following solvents incrementally being less satisfactory.

As is evident from the flash point listing in the above chart, the solvents used in the liquid scintillation process are generally highly flammable with the exception of pseudocumene which is rated as combustible. This is an undesirable characteristic in that it limits the methods by which the solvent, and thus the entire scintillation cocktail, can be disposed of. Furthermore, solvents generally are highly volatile as indicated by their high vapor pressures. This is also undesirable in that they easily evaporate increasing environmental contamination and toxic exposure to a user.

In order to avoid these derogatory effects alternative solvent compositions have been attempted. United States Pat. No. 3,444,094 specifically considered volatility and flammability concerns of the solvent used in a liquid scintillation solution. Therein is presented a solvent composition ditolylmethane as an improved scintillation solvent. [Ditolylmethane comprises a pair of toluene molecules bound by a methane group.]Ditolylmethane, however, has been found not to be readily available and thus of limited benefit.

Over the past 10 years or so, the direction of solvent development has been in linking long hydrocarbon chains (alkyl groups) to typical aromatic solvent molecules, to attempt to increase their stability and reduce their volatility. See Review of the Evolution of Safety, Ecological and Economic Aspects of Liquid Scintillation Counting Materials and Techniques by D. A. Kalbhen and V. J. Tarkkanen, found in Advances in Liquid Scintillation Counting, McQuarrie, Eddis and Wiebe, University of Alberta, Edmonton, Alberta, Canada 1983. Such modified solvent molecules are exemplified by the following figure.

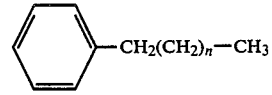

where n=6 to 12

Those developed solvents have met with limited success. While the long hydrocarbon chains provide a larger molecule which should exhibit the improved effects, these hydrocarbon chains have been found to dilute the aromatic nucleus of the solvent molecule resulting in inefficient energy transfer and thus poor scintillation efficiency for the liquid scintillation cocktail. Examples of these modified solents are 1-phenyloctane and 1-phenyldecane, both of which are available from the Aldirch Chemical Company of Milwaukee, Wisconsin. Also exemplary is 1-phenyl-5-ethylhexane which exhibits a non-linear hydrocarbon chain.

SUMMARY OF INVENTION

The present invention is a novel liquid scintillation solution, otherwise known as a liquid scintillation cocktail, which consists of a fluor in solution with a select solvent compound. The fluor is a typical fluorescing organic compound, which emits light, i.e. scintillates to release energy received from interaction with another excited or ionized molecule, as commonly used in liquid scintillation solutions. Examples are PPO or PBD as described above. The liquid scintillation solution may also contain other commonly used modifying agents, such as an emulsifier which is used to insure solution of an aqueous sample, or secondary fluors.

The solvent embodied in the present invention consists two or more aryl groups (aromatic rings) bound together by an alkane group which forms a backbone for the solvent molecule. The solvent compound is liquid at room temperature. At least one aromatic ring has three carbon substituents, each substituent being $SP^3$ hybridized. The carbon substituents may be $SP^3$ alkanes or more specifically methane groups. Two of the three carbon substituents bound to the aromatic ring are positioned in ortho relationship, with the third carbon substituent being isolated from the other substituents at the location on the aromatic ring to which it is bound. In other words the binding sites on the aromatic ring for the carbon substituents is generally a one, two, four pattern. One of the carbon substituents bound to the aromatic ring provides a bridge to the second or other aromatic rings of the solvent compound. The second aromatic ring may also possess three carbon substituents, each of the carbon substituents having an $SP^3$ hybridization, though only one substituted aromatic ring is required in the solvent compound.

The solvent compound is generally described by the following chemical formula:

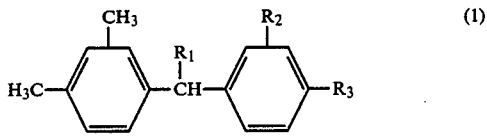
(1)

where $R_1$, $R_2$ and $R_3$ are either hydrogen atoms(H) or methyl groups ($CH_3$).

The first of the aromatic rings may be described as a 1,2,4 tri-substituted benzene, having two substituent groups which are methyl groups and the third substituent group as a bridging group to a second or other aromatic ring. Where $R_2$ and $R_3$ are methyl groups, the second aromatic ring may also be described as a 1,2,4 tri-substituted benzene. Each of the carbon substituent groups have a single bond to their respective aromatic ring.

A liquid scintillation solution comprising the described formulation is safe and effective. It provides a chemical composition which exhibits efficient energy transfer by its constituents permitting highly efficient fluorescence activity when a radioactively labeled sample is intermixed. Additionally, due to the solvent composition, the scintillation solution is disposable and non-hazardous. This is primarily due to the large molecular size of the solvent compound in which the fluor is dissolved. Large molecular size results in a higher boiling point and a lower vapor pressure, meaning the solvent is less volatile. Lower volatility results in a reduced toxic exposure to the user since a lesser amount of vapor enters the environment. Furthermore, lower volatility results in reduced flammability which is very important. Organic solvents are notoriously combustible and in proper proportion with oxygen are highly flammable or even explosive. Thus, there are many restrictions limiting one's ability to dispose of such materials. Reduced volatility substantially reduces flammability and permits the liquid scintillation compound to be disposed of in an ordinary manner without problem or cost.

Finally, due to the increased size of the solvent molecule, the liquid scintillation solution is less likely to penetrate a typical liquid scintillation vial made of a plastic material, as is commonly used. This eliminates any possibility of a liquid scintillation solution interfering with the counting process of the fluorescence activity caused by the sample as is performed in a typical liquid scintillation instrument. It further insures safe and stable storage of liquid scintillation solution in the plastic vial or other container.

DESCRIPTION OF THE PREFERRED EMBODIMENT

The following examples of a liquid scintillation solution embodying the invention are presented.

EXAMPLE 1

500 ml of 1-phenyl-1-xylylethane (PXE) is added to a one liter volumetric flask. The chemical formula for PXE is described by the generic formula (1) above, where $R_1$ is a methyl ($CH_3$),
$R_2$ is a hydrogen atom(H),
$R_3$ is a hydrogen atom(H) resulting in the chemical formula

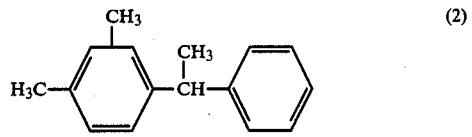
(2)

Five grams of a primary fluor, such as PPO, are next added and preferably 0.50 grams of a secondary fluor, bis-MSB are added. At room temperature and pressures, the fluors are mixed by stirring until dissolved in the PXE solvent. Solution volume is then increased to equal one liter by addition of necessary amounts of PXE solvent.

EXAMPLE 2

500 ml of 1-phenyl-1-xylylethane (PXE) is added to a one liter volmetric flask. The chemical formula for pxe is described by the generic formula (1) above, where $R_1$ is a methyl ($CH_3$),
$R_2$ is a hydrogen atom(H),
$R_3$ is a hydrogen atom(H) resulting in the chemical formula

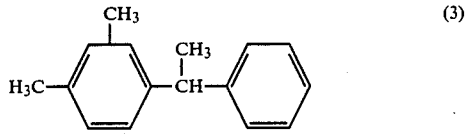
(3)

Five grams of a primary fluor, such as PPO, are next added and preferably a 0.50 grams of a secondary fluor, bis-MSB are added. At room temperature and pressure the fluors are mixed by stirring until dissolved in the PXE solvent. A solution solvent is then increased to equal one liter by addition of necessary amounts of PXE.

Next, 400 grams of Triton ® n-101 (nonylphenyl polyethylene glycol ether) chemical available from the Rohm and Haas Company, Philadelphia, Pa. is added. This is an emulsifier permitting use of the liquid scintillation solution with aqueous samples. The emulsifier is mixed into the solution by stirring until it is dissolved.

Finally, solution volume is increased to equal one liter by addition of necessary amounts of PXE solvent.

EXAMPLE 3

A liquid scintillation solution is made as described in either Example 1 or Example 2 with the solvent PXE being replaced by a solvent 1,1-dixylyethane (DXE).

The chemical formulation of DXE is described by the generic formula (1) above, where
R₁ is methane (CH₃),
R₂ is methane (CH₃) and
R₃ is methane (CH₃)
yielding the chemical formula:

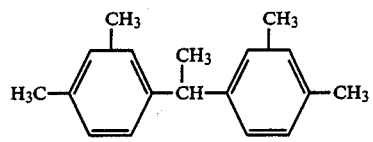

EXAMPLE 4

A liquid scintillation is made as described in either Example 1 or 2 with the solvent PXE being replaced by phenylxylylmethane (PXM). The chemical formulation of pxm is described by the general formula (1) above, where
R₁ is a hydrogen atom(H),
R₂ is a hydrogen atom(H),
R₃ is hydrogen atom(H).
yielding the chemical formula

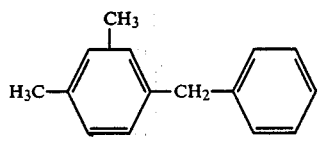

EXAMPLE 5

A liquid scintillation is made as described in Examples 1 or 2 with the solvent PXE being replaced by dixylylmethane (DXM). The chemical formulation of dxm is described by the general formula above, where
R₁ is a hydrogen atom(H),
R₂ is a methyl group (CH₃)
and R₃ is a methyl group (CH₃).
yielding the chemical formula

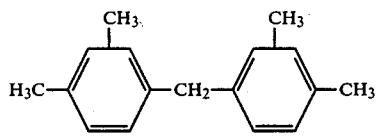

I claim:

1. A liquid scintillation solution composition in which a radioactively labeled sample is mixed to obtain a scintillation phenomenon by which the sample is analyzed, comprising a mixture of a fluor compound and a solvent compound, liquid at 20° C. in its pure state, selected from a group having the chemical formula

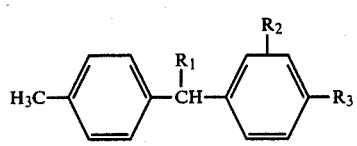

wherein R₁ is a methyl group and R₂ and R₃ are each a hydrogen atom or a methyl group.

2. A liquid scintillation solution as described in claim 1 wherein said fluor compound is dissolved in said solvent.
3. A liquid scintillation solution as described in claim 1 additionally comprising an emulsifying agent.
4. A liquid scintillation solution as described in claim 1 additionally comprising a secondary flour compound.
5. A liquid scintillation solution as described in claim 1 wherein said fluor is selected from the group consisting of oxazoles or oxadiazoles.
6. A liquid scintillation solution as described in claim 4 wherein said secondary fluor is selected from the group consisting of oxazoles or oxadiazoles.
7. A liquid scintillation solution as described in claim 3 wherein said emulsifying agent is selected from the group consisting of Triton ® ompounds or nonylphenyl polyethylene glycol ether compounds and polyethoxylated surfactants.
8. A liquid scintillation solution as described in claim 1 wherein said solvent has the chemical formula

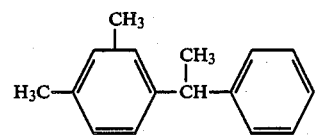

9. A liquid scintillation solution as described in claim 1 wherein said solvent has the chemical formula

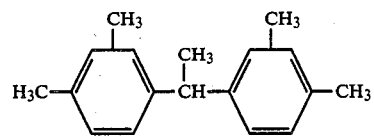

10. A liquid scintillation solution as described in claim 1 wherein said fluor is present in an amount of 1 to 20 grams per liter of solution.
11. A liquid scintillation solution as described in claim 4 wherein said secondary fluor is present in an amount of 0.05 to 5 grams per liter solution.
12. A liquid scintillation solution as described in claim 2 wherein said emulsifying agent is present in an amount of 100 to 500 grams per liter of solution.
13. A liquid scintillation solution composition in which a radioactively labeled sample is mixed to obtain a scintillation phenomenon by which the sample is analyzed, comprising a mixture of a fluor compound and a solvent compound selected from a group having the chemical formula

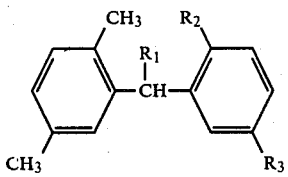

wherein R₁ is a methyl group and R₂ and R₃ are each a hydrogen atom or a methyl group.

14. A process of making a liquid scintillation solution composition in which a radioactively labeled sample can be mixed to obtain a scintillation phenomenon by which the sample can be analyzed comprising mixing a select amount of a solvent compound, liquid at 20° C. in its pue state, selected from a group having the chemical formula

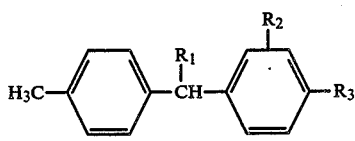

wherein $R_1$ is a methyl group and $R_2$ and $R_3$ are each a hydrogen atom or a methyl group.

15. A process as described in claim 14 wherein a secondary fluor is also mixed with the solvent and the primary fluor.

16. A process as described in claim 14 wherein 3–10 grams of primary fluor is mixed in an amount of the solvent to yield a solution volume of one liter.

17. A process as described in claim 14 wherein 3–10 grams of primary fluor and 0.10–1.0 grams of secondary fluor are mixed in an amount of the solvent to yield a solution volume of one liter.

18. A process as described in claim 14 wherein an emlsifying agent is also mixed with the solvent and primary fluor.

19. A process as described in claim 15 wherein an emulsifying agent is also mixed with the solvent. primary fluor and secondary fluor.

20. A process as described in claim 1 wherein said solvent is 1-phenyl-1-xylylethane.

21. A process as described in claim 20 wherein said primary fluor is PPO.

22. A process as described in claim 1 wherein said solvent is 1,1-dixylylethane 23. A process as described in claim 24 wherein said primary fluor is PPO.

* * * * *

UNITED STATES PATENT AND TRADEMARK OFFICE
CERTIFICATE OF CORRECTION

PATENT NO. : 4,867,905

DATED : September 19, 1989

INVENTOR(S) : Stephen W. Wunderly

It is certified that error appears in the above-identified patent and that said Letters Patent is hereby corrected as shown below:

Column 9 in claim 1 and columns 11 in claim 14, the chemical formula, each occurrence, should appear as follows:

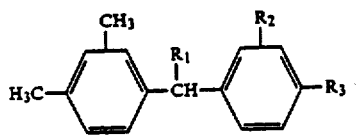

Column 10,   line 16,   delete "Triton® ompounds or".

Column 11,   line 1,    change "pue" to --pure--;

line 12,   insert --with a primary fluor, and stirring the admixture until the primary fluor is dissolved in the solvent-- after "methyl group".

UNITED STATES PATENT AND TRADEMARK OFFICE
CERTIFICATE OF CORRECTION

PATENT NO. : 4,867,905

DATED : September 19, 1989

INVENTOR(S) : Stephen W. Wunderly

It is certified that error appears in the above-identified patent and that said Letters Patent is hereby corrected as shown below:

Column 12, line 6, change "emlsifying" to --emulsifying--;

line 9, delete "." before "primary" and insert --,--.

Signed and Sealed this

Seventeenth Day of December, 1991

*Attest:*

HARRY F. MANBECK, JR.

*Attesting Officer*   *Commissioner of Patents and Trademarks*